US011995996B1

(12) United States Patent
Puglisi et al.

(10) Patent No.: US 11,995,996 B1
(45) Date of Patent: May 28, 2024

(54) METHOD OF DELIVERING REPEATERS IN A HOSTILE ENVIRONMENT AND A DRONE THEREFOR

(71) Applicant: US Govt as rep by the Secy of the Air Force, Wright Patterson AFB, OH (US)

(72) Inventors: Joseph Puglisi, Hill AFB, UT (US); Nicholas Black, Charlotte, NC (US); Mary Hood, Brighton (GB); Michael Anderson, Colorado Springs, CO (US); Joseph Anderson, Edwards, CA (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 172 days.

(21) Appl. No.: 17/655,853

(22) Filed: Mar. 22, 2022

Related U.S. Application Data

(60) Provisional application No. 63/298,489, filed on Jan. 11, 2022.

(51) Int. Cl.
*G08G 5/00* (2006.01)
*B64C 39/02* (2023.01)
*B64U 10/10* (2023.01)
*B64U 50/19* (2023.01)
*B64U 101/20* (2023.01)

(52) U.S. Cl.
CPC ........... *G08G 5/003* (2013.01); *B64C 39/024* (2013.01); *B64U 10/10* (2023.01); *B64U 50/19* (2023.01); *B64U 2101/20* (2023.01)

(58) Field of Classification Search
CPC ........ G08G 5/003; G08G 5/00; B64C 39/024; B64C 39/02; B64U 10/10; B64U 50/19; B64U 2101/20; G05D 1/00
See application file for complete search history.

(56) References Cited

U.S. PATENT DOCUMENTS

| | | | |
|---|---|---|---|
| 3,876,201 A | 4/1975 | King | |
| 8,538,605 B1* | 9/2013 | Riley | B64D 1/08 |
| | | | 701/3 |
| 8,820,305 B2 | 9/2014 | Victor et al. | |
| 9,004,052 B1 | 4/2015 | Poirier | |
| 2012/0180354 A1* | 7/2012 | Sullivan | F41A 21/48 |
| | | | 42/16 |
| 2016/0293015 A1* | 10/2016 | Bragin | B64C 39/024 |

(Continued)

FOREIGN PATENT DOCUMENTS

| | | | | |
|---|---|---|---|---|
| GB | 2282351 A * | 4/1995 | ............. | F42B 15/22 |
| WO | WO-2019032644 A1 * | 2/2019 | ........... | B64C 39/024 |

*Primary Examiner* — Yonel Beaulieu
(74) *Attorney, Agent, or Firm* — AFMCLO/JAZ; Larry L. Huston

(57) ABSTRACT

A drone for delivering plural repeaters in a hostile environment and method of delivering plural repeaters from the drone. The drone is controllable from a remote base station and carries a payload of repeaters on a round tray. The tray has a dispensing hole, complementary to the geometry of the repeater for dispensing the repeaters as needed. Repeaters are consecutively dispensed at stations as determined by an operator. A central radial arm sweeps each repeater around the tray, in turn, until the hole is encountered and the repeater gravity drops to a surface below. The drone may have two or more vertically stacked trays to increase payload without increasing footprint.

20 Claims, 9 Drawing Sheets

(56) References Cited

U.S. PATENT DOCUMENTS

| | | | |
|---|---|---|---|
| 2018/0033315 A1* | 2/2018 | Winkle | B60L 53/305 |
| 2019/0014461 A1* | 1/2019 | Winkle | G08B 21/02 |
| 2019/0095687 A1* | 3/2019 | Shaw | B64C 39/024 |
| 2019/0098433 A1* | 3/2019 | Shaw | H04W 4/46 |
| 2021/0371085 A1* | 12/2021 | Campbell | B64U 30/24 |
| 2022/0286166 A1* | 9/2022 | Pham | H04W 28/0268 |
| 2023/0224018 A1* | 7/2023 | Anderson | H04B 7/2606 455/431 |

* cited by examiner

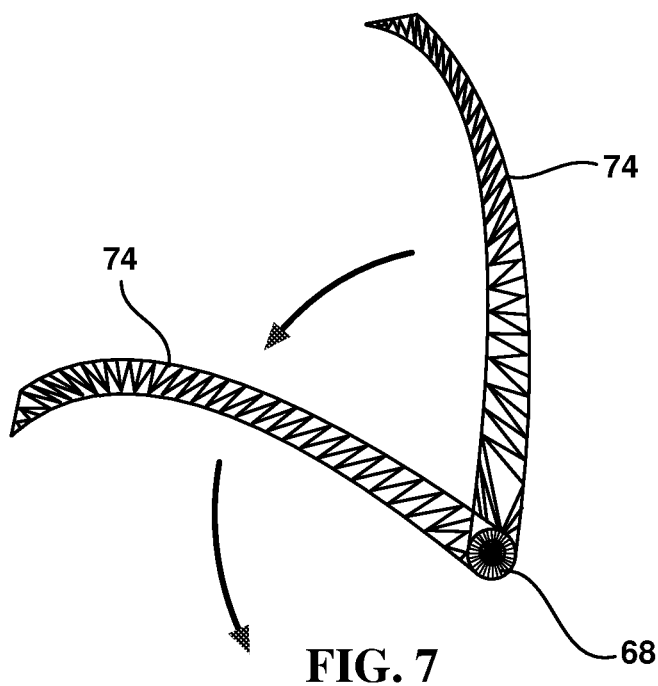
FIG. 7
FIG. 8
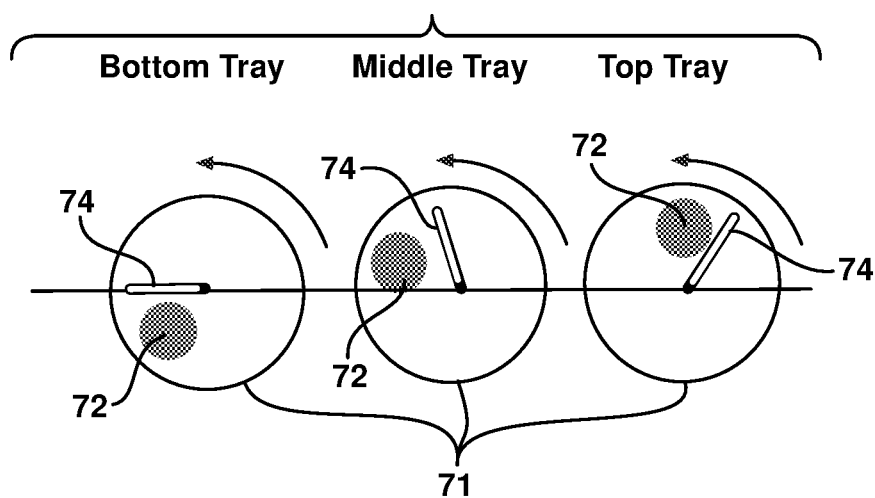

METHOD OF DELIVERING REPEATERS IN A HOSTILE ENVIRONMENT AND A DRONE THEREFOR

CROSS REFERENCE TO RELATED APPLICATION

This application claims priority to and the benefit of provisional U.S. application Ser. No. 63/298,489 filed Jan. 11, 2022, the disclosure of which is incorporated herein by reference.

STATEMENT OF GOVERNMENT INTEREST

The invention described herein may be manufactured and used by and for any governmental purpose without the payment of any royalty.

FIELD OF THE INVENTION

This invention is directed to a drone for delivery of line of sight repeaters in a hostile environment and more particularly to such a drone for delivering repeaters within the footprint of a drone at rest.

BACKGROUND OF THE INVENTION

Hostile environments can present significant communication challenges, whether indoors or outdoors. Oftentimes a forward agent viewing, recording or engaged with a hostile actor or hostile situation posing a threat must communicate in real time with command personnel operating at a base station. Such communications typically use wireless signals which rely upon line of sight communications. But if walls, stairs, boulders, tunnels, large vehicles, debris, etc. obstruct the line of sight, communication is lost. Furthermore, an explosion or deliberate disruption may terminate communication from a previously established and operable network. For example, cellular signals may not reach the depths of a building or cellular towers may be rendered inoperable by hostile actors.

Pre-installing repeaters between the base station and the forward agent directly engaged with the threat is infeasible. Electromagnetic interference may require repositioning of the repeaters. Furthermore, the forward agent and/or the threat may change position or relocate to a previously unknown position.

The forward agent may be a robot, person or drone. If the forward agent is a robot, dynamically installing repeaters in real time during advance towards the threat may be infeasible due to the weight penalty and limited maneuverability. If the forward agent is a person, installing repeaters during advance towards the threat may be infeasible due to the weight penalty and potential distraction from the mission. Wired systems are infeasible with other types of forward agents for much the same reasons and catastrophic sabotage due to cutting the wire. If the forward agent is a drone, a wire connection is infeasible as potentially interfering with flight.

One attempt shown in U.S. Pat. No. 9,100,988 which deploys a mobile repeater system in a vehicle. But this attempt is infeasible for use indoors and does not provide for remote, dynamic adjustment of the repeater. U.S. Pat. No. 8,638,214 is directed to geolocating and is unhelpful for dynamic indoor situations. U.S. Ser. No. 11/157,021 uses a drone to check pre-programmed locations within a building for security, and is likewise unhelpful for dynamic hostile situations. U.S. Pat. No. 8,353,373 proposes an expensive network using multiple robots as radio relays, but does not provide for centralized control of the individual robots and can be cumbersome when attempting to deploy multiple robots in a congested environment.

None of the known attempts in the art overcome the problems of dynamic and remote deployment and positioning of repeaters in a dynamic hostile environment. For example, drones known to the inventors having delivery capability are believed to be inadequate to secure the repeaters during transit. Increasing the footprint to securely transport the delicate electronics of repeaters is infeasible as fewer landing sites are then available. In a hostile and dynamic environment landing space can be effervescent and at a premium.

Repeaters must be safely delivered to a location, as determined in real time, without damage and without requiring undue delivery time. The present invention uses a drone having an advantageous payload to footprint ratio to deliver repeaters where needed.

SUMMARY OF THE INVENTION

The unmanned drone of the present invention is adapted to advantageously deliver a payload of plural repeaters, in serial succession at desired and previously undetermined locations. The repeaters are delivered entirely within the footprint of the drone. The drone comprises at least one copter for flying said drone from a first location to a second location, each having at least one respective propeller-motor driven rotatable propeller, a shaft-motor driven axially rotatable longitudinal shaft extending from a first end operably connected to the shaft-motor to a second end longitudinally spaced therefrom to define a longitudinal axis, a microcontroller for controlling the drone, at least one battery in electrical communication with and for supplying energy to each propeller-motor, a frame for joining the microprocessor, battery, said shaft-motor and said at least one propeller-motor driven propeller in operable relationship, a dispensing assembly joined to and depending from the frame for dispensing a plurality of repeaters therefrom at determinable repeater stations; the dispensing assembly has a first circular tray adapted to carry a plurality of circumferentially spaced repeaters thereon with a dispensing hole for gravity dispensing a repeater therethrough and an upstanding perimeter lip for retaining the repeaters within said tray until dispensed and a radial arm responsive to a command signal to be rotatable about the longitudinal axis in a forward rotation direction in order to propel a repeater towards the dispensing hole.

BRIEF DESCRIPTION OF THE DRAWINGS

FIG. 7 is a scale top plan view of two counter-clockwise rotatable arms, vertically stacked for use with two vertically stacked trays.

FIG. 8 is a schematic exploded top plan view of a three tray dispensing assembly.

DETAILED DESCRIPTION OF THE INVENTION

Figure 1:
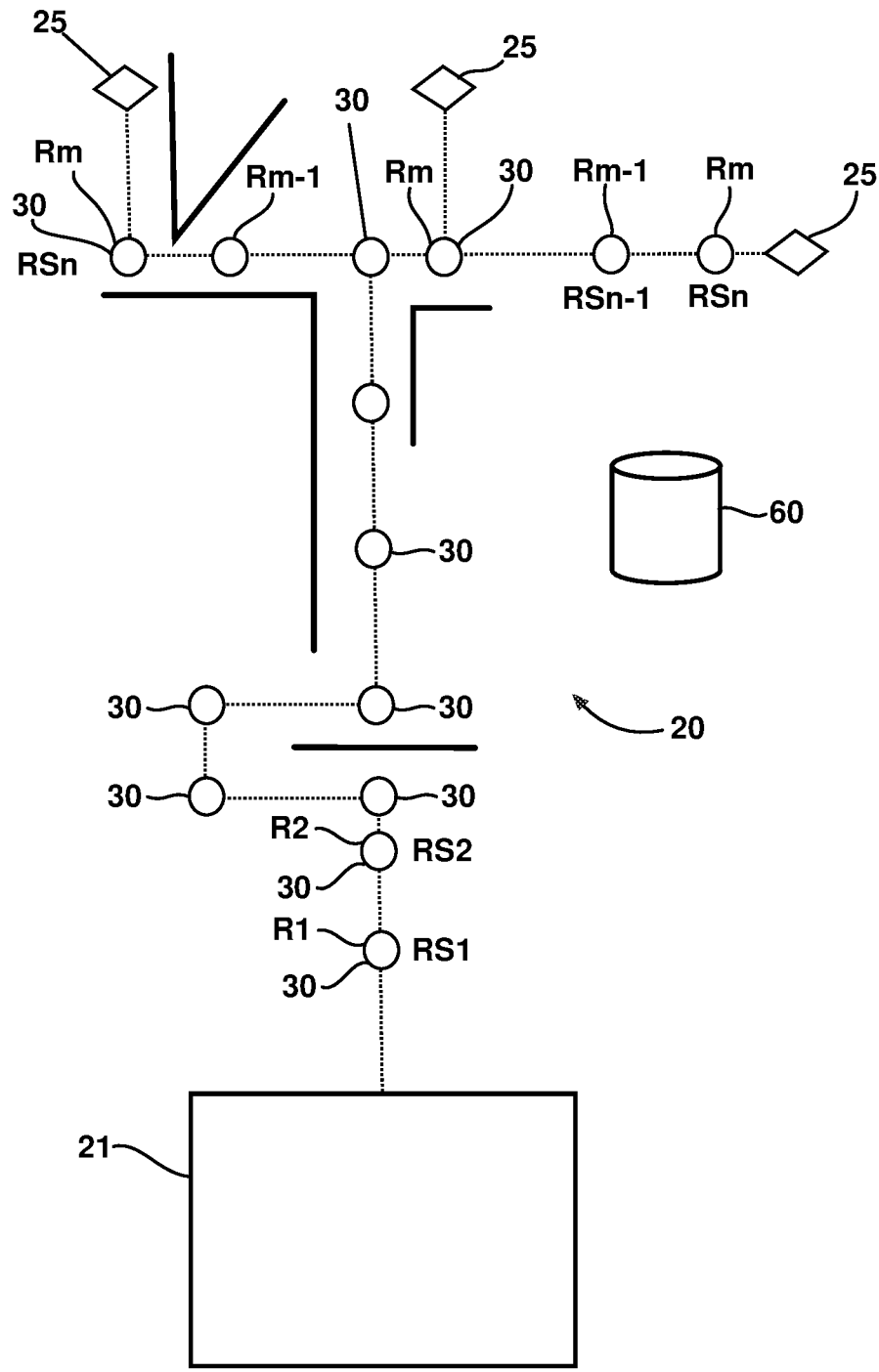
FIG. 1 is a schematic top plan view of a communication system according to the present invention having a branched path of repeater stations.

Referring to FIG. 1, a communication system 20 comprises a base station 21, and at least one drone 60 in communication with the base station 21. The entire communication system 20 is portable, for use where a hostile environment may be present. By portable, it is meant that the entire communication system 20 may be assembled and rapidly deployed in different locations and various situations without undue infrastructure or site preparation.

The drone 60 may initially be in direct communication with the base station 21, and transition to communication through a plurality of dynamic, depositable, remotely controllable repeaters 30. The communication system 20 further communicates with at least one forward agent 25. The forward agent 25 may be a battery 36 powered autonomous or remotely controllable robot or a person. The forward agent 25 carries a transceiver 37. The transceiver 37 communicates signals to/from the base station 21 as described below. The signal from the base station 21 through a series of successive repeaters 30 to the drone 60 is referred to as a forward signal. The signal from the drone 60 back through the repeaters 30 in reverse succession to the base station 21 is referred to as the return signal.

One or more operators may be functionally in control of the mission from the base station 21. The operators send the drone 60 from the base station 21 into the mission, it being understood that the drone 60 need not actually be at the base station 21 to be controlled from the base station 21.

The forward agent 25, particularly a robotic forward agent 25, may have any of or any combination of a microphone, speaker, video camera, thermal imaging camera, infrared camera, radiation detector, explosive detector, GPS, narcotics detector, thermometer, vibration detector, chemical/biological weapons detector, etc. collectively referred to as sensors. The return signal may comprise information and data gathered by the sensors, herein referred to as intelligence. The forward agent 25 forms no part of the claimed invention, except as may be specifically claimed below.

The base station 21 controls the operation of the drones 60 and the repeaters 30, and may be staffed by one or more operators or optionally be remotely controlled. The base station 21 is positioned in a safe location for the staff and can serve as the control center for operations. The base station 21 receives, and optionally records, real time wireless signals from the forward agent 25. The base station 21 may be disposed indoors or outdoors as the situation requires. The base station 21 dispatches the drone 60 from a secure location to advance towards the threat. The forward agent 25 may also be dispatched from the base station 21 or from another location.

Although a single drone 60 is described below, one of the skill will understand the communication system 20 is not so limited and may deploy a plurality of drones 60. The drone 60 has a dispensing assembly 70 for dispensing repeaters 30 at determinable locations. The drone 60 is controlled from the base station 21 and deposits repeaters 30 in a line of sight configuration as determined to be helpful or necessary during the operation. Repeaters 30 may be loaded onto the drone 60 at the base station 21 or loaded prior to arrival at the hostile environment. The location of repeater stations is not arbitrary, and may be determined by an operator in real time.

In operation, at least one operably maneuverable drone 60 carries a plurality of deliverable repeaters 30 from the base station 21 to a plurality of successive line of site repeater stations in turn and serially deposits a repeater 30 at each of the line of sight repeater stations from a first repeater 30 to a last repeater 30. Upon depletion of the payload of the plurality of repeaters 30, the drone 60 may return to the base station 21 for reloading with additional repeaters 30 as necessary. Alternatively or additionally, additional drones 60 may be used to deliver more repeaters 30, as needed. The plurality of repeaters 30 may comprise from 2 to 50 successive repeaters 30. The drone 60 may traverse the same path back and forth from the base station 21 to one or more points of interest or traverse different paths, as the changing circumstances may dictate.

The locations of the repeater stations are usually not predetermined, due to the unknown and changing conditions in a hostile environment. The repeater stations comprise a first repeater station RS1, and at least a second repeater station RS2, as deposited in order, until a nth repeater station RSn in direct communication with the forward agent 25 is established. Using this arrangement, either or both of the drone 60 and/or the forward agent 25 can wirelessly transmit a signal from a location of interest to the repeater 30 Rn at the nth repeater station Rn, closest to the site of interest. The signal is consecutively transmitted from the nth repeater 30 Rn to the next (n−1) repeater 30 Rn−1 at the next (n−1) repeater station RSn−1, and so on in turn, until signal is received by the first repeater 30 R1 located at the first repeater station RS1; and transmitted from the first repeater 30 R1 to the base station 21. Upon receipt at the base station 21, operator can interpret and act upon the signal. Appropriate actions may include transmitting a signal back to the forward agent 25. The signal may be transmitted from the base station 21 to the forward agent 25 by reversing this procedure.

The repeaters 30 bilaterally receive and transmit signals in a line of sight, through other repeaters 30 in order, between the ultimate destinations of the base station 21 and forward agent 25. As used herein a forward signal is transmitted from the base station 21 through one or more repeaters 30 to the forward agent 25. A return signal is transmitted from the forward agent 25 back through one or more repeaters 30 to the base station 21.

The repeaters 30 are deposited, in sequence, to form a line of sight communication from the forward agent 25 to the base station 21. The numbering scheme used herein is to designate the repeaters 30 in the order dispensed from R1, R2, R3 . . . Rm. R1 is the first repeater 30 to be deposited and is typically closest to the base station 21, R2 is the next repeater 30 to be deposited, in turn, until the last repeater 30 Rm is deposited closest to and in direct communication with the forward agent 25. The forward agent 25 transmits a return signal to repeater 30 Rm which, in turn, receives the return signal from the forward agent 25 and transmits the return signal, in turn, to repeater 30 Rm−1, which transmits the return signal to the next repeater 30 Rm−2 and so on until the signal is received at repeater 30 R1. The signal from repeater 30 R1 is then transmitted to the base station 21 for interpretation and analysis. Another signal may be transmitted from the base station 21 to repeater 30 R1 where it is received and transmitted to repeater 30 R2 and so on until the signal reaches repeater 30 Rm. Repeater 30 Rm then transmits the signal to the forward agent 25.

The repeaters 30 may be positioned as necessary to optimize signal transmission as described below. Positioning includes both disposal at a specific location within the hostile environment and azimuthal orientation at that location.

Figure 2:
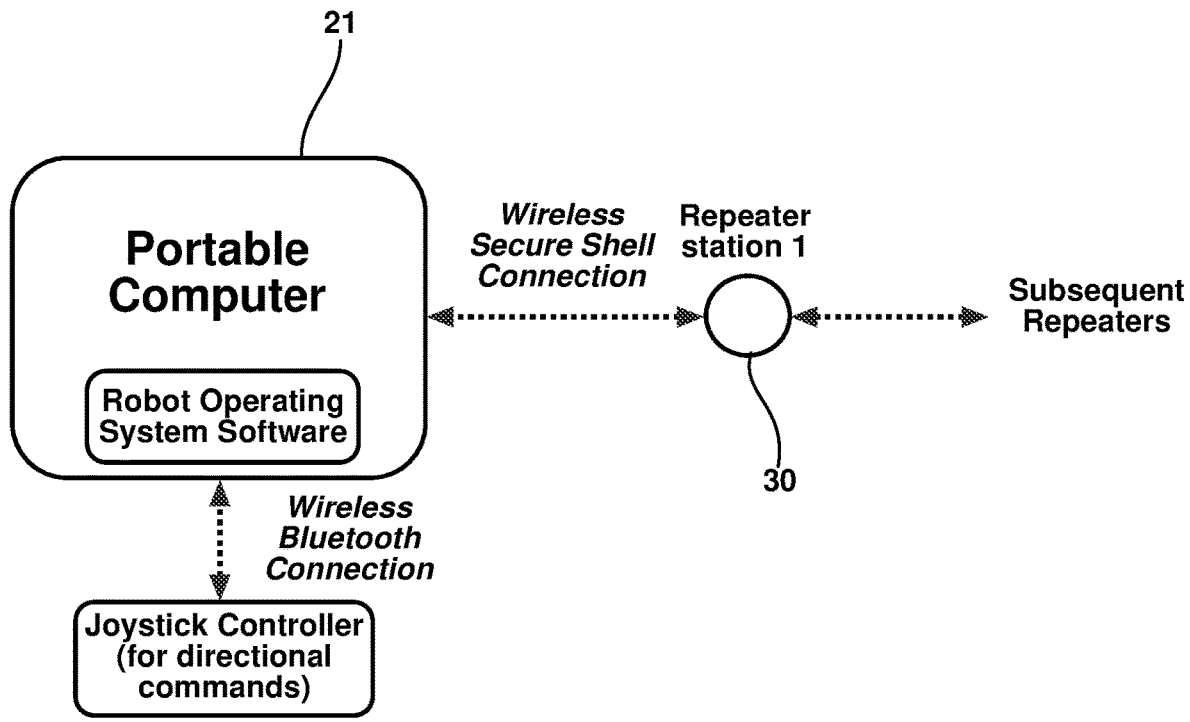
FIG. 2 is a block diagram of the base station hardware.

Referring to FIG. 2, the base station 21 may comprise a laptop, smartphone or other controller for receiving signals from the forward agent 25 and for converting the signals for audio/video display to one or more operators. The base station 21 further comprises a wireless network for communication with the drone 60, R/C transmitter and preferably a joystick for controlling the drone 60. If the forward agent 25 is a robot, the base station 21 has controls for maneuvering and otherwise operating the robot.

The base station 21 may comprise any mobile computing device such as a phone, tablet, laptop, etc. with adequate control software. The operating system preferably has at least 2 GB RAM and a processing speed of 1 GHz. A Hewlett Packard ZBook 17 G5 laptop computer with the Linux Ubuntu operating system and Robot Operating System software has been found suitable.

The base station 21 can wirelessly connect to the forward agent's 25 on-board control computer via a secure shell (SSH) to remotely initiate autonomous control algorithms, display status messages, telemetry information, and/or retrieved intelligence information during the mission. The base station 21 may send direct control commands to the forward agent 25 in line of sight, but typically communicates through the repeaters 30. An operator can guide the exploration of the forward agent 25 by providing simple directional commands via an associated joystick. The joystick may connect to the base station 21 and multiple computing devices via a wired connection or wireless Bluetooth connection. Typical commands for the drone 60 include velocity requests forward/back, right/left, and/or up/down. These commands are relayed to the drone 60 on-board control computer via the repeater 30 network. The drone 60 on-board flight algorithms interpret these motion requests and convert the requests to the necessary motor 35 behaviors to move the drone 60 as desired. Typical commands for the repeaters 30 include driving a first motor 35, driving a second motor 35 and driving both motors 35. Plural repeaters 30 may be operably and functionally driven at the same time in response to command signals from the base station 21.

Figure 3:
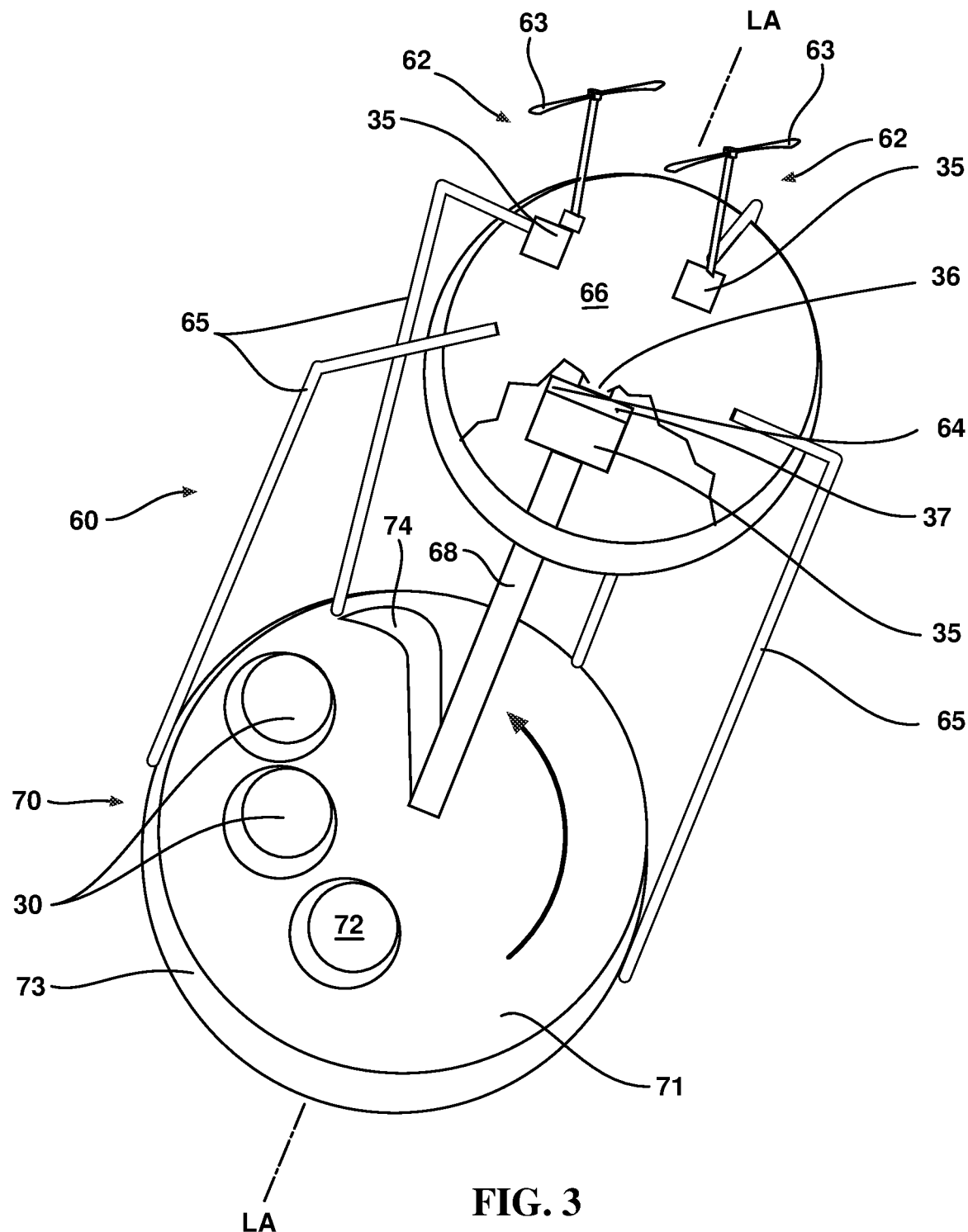
FIG. 3 is a schematic perspective view of a single tray quadrotor drone according to the present invention, shown partially in cutaway and having the two front rotors removed for clarity.

Referring to FIG. 3, the drone 60 may have one or more rotors 62, preferably four rotors 62, a battery 36, a flight controller 32, an on-board companion computer 32C, a R/C receiver or transceiver 37, at least one dispensing assembly 70 as described below and a brushless motor 35 for each rotor 62. In an operational scenario, the on-board computer may be used for navigation, mapping, intelligence gathering, and further for positioning the repeaters 30, as described below.

The companion computer 32C is able to run Linux (Ubuntu LTS versions 16.04 or 18.04), ROS, or equivalent and has at least one USB port. Suitable companion computers 32C are preferably lightweight to conserve payload. The transceiver 37 has at least six channels, communicates over TCP and supports pulse position modulation/SBUS receivers.

Figure 4:
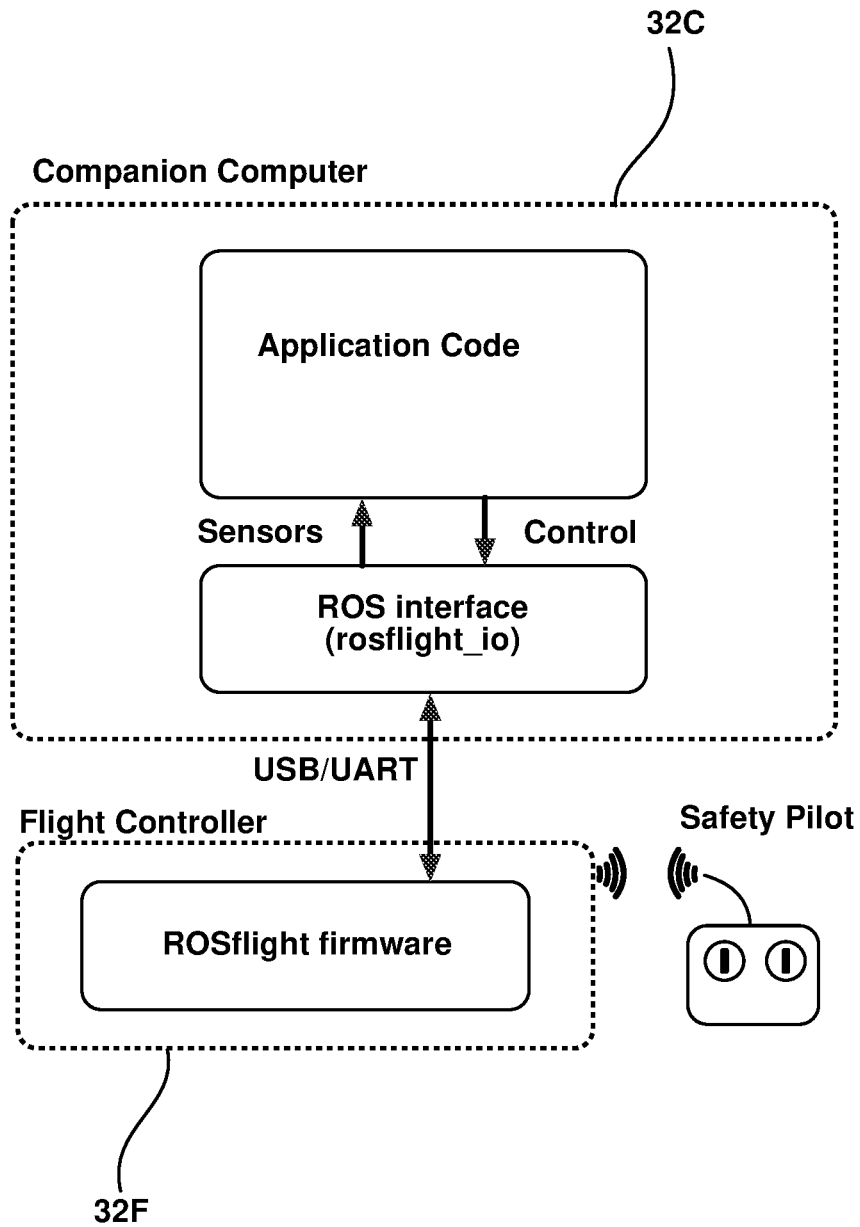
FIG. 4 is a block diagram of a flight controller for the drone.

Referring to FIG. 4 the flight controller 32F may have an embedded circuit board to run ROS flight firmware and perform I/O with the onboard sensors and ESCs. The flight controller 32F preferably has capability of at least 2000 degrees/second with a 3-axis MEMS gyro plus accelerometer with a 32 bit processor running at a speed of at least 72 MHz. The flight controller 32F preferably has 8 channel RC input for standard receivers (PWM), such as a PPM Sum receiver (FrSky), or a Spektrum Satellite receiver. A built in FrSky telemetry inverter (shared with the main port) and a SBUS inverter are also useful for this configuration. An AfroFlight Naze32, Rev. 6 flight controller 32F has been found suitable.

The boards preferably have at least a 32 bit with CMOS and a M4F CPU running at 3.3V/72 MHz. A suitable board is available from STMioroelectronics N.V. of Geneva, Switzerland under model number STM32F429ZIT6. Another suitable board may have an Arm Cortex-M3 MCU with 128 Kbytes of Flash memory, 72 MHz CPU, motor control, USB and CAN, and is also available from STMicroelectronics N.V under model number STM32F103x.

ROSflight, available from BYU MAGICC Lab, is used with a companion computer 32C mounted on the drone 60 and running ROS. The ROS interface is provided by a ROSflight io node. ROSflight packages are installed on both the companion computer 32C and a base station 21 computer. The Rosflight io node functions as a bridge between ROSflight and the MAVLink communication with the flight controller 32F. This node is run on the base station 21 computer having the physical serial connection to a flight controller 32F.

The companion computer 32C will run the node that communicates with the flight controller 32F over a serial connection. The base station 21 computer uses message and service definitions to call services or to subscribe and publish to topics.

Configuration of the flight controller 32F is preferably performed through a ROS service API as provided by ROSflight io. Sensor data, such as IMU measurements, are streamed from the flight controller 32F to the companion computer 32C and published as ROS topics. Control setpoints may be sent to the flight controller 32F by publishing to the appropriate ROS topic.

Figure 5:
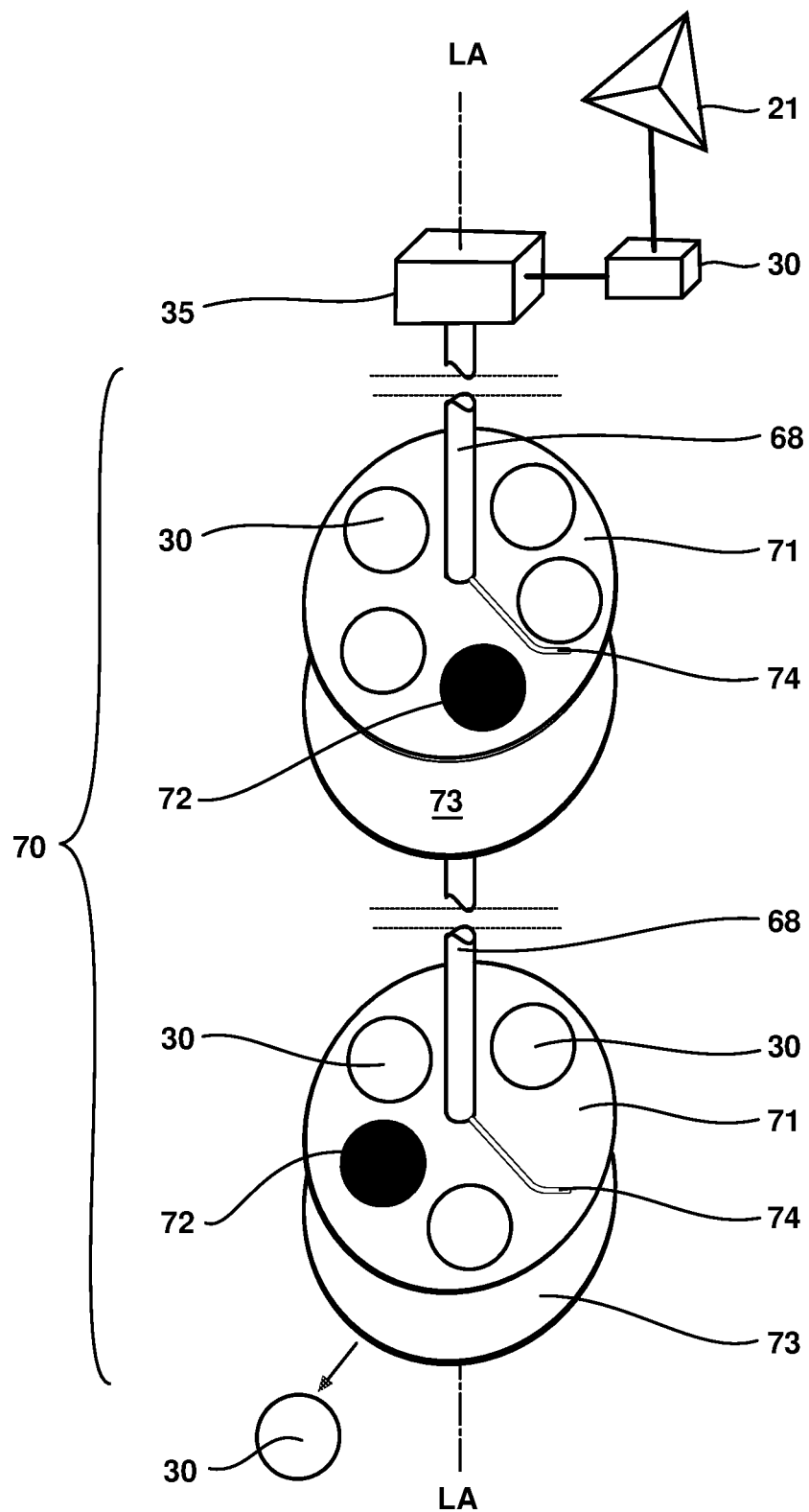
FIG. 5 is a schematic perspective view of a dispensing assembly according to the present invention.

Referring to FIG. 5, the drone 60 is unmanned and delivers one or more repeaters 30 to a like number of remote repeater stations. Location selection for delivery of the repeater 30 to a repeater station typically occurs in real time as dictated from the base station 21. The drone 60 comprises a copter for flying the drone 60 from a first location to a second location. The drone 60 preferably has capability to travel without interruption from the base station 21 or a location nearby, to the forward agent 25 while carrying the plural repeater 30 payload described below.

The drone 60 has a frame 66 for joining at least one motor 35 and at least one rotor 62 for powering at least one propeller 63 in rotatably operable relationship with a dispensing assembly 70 for dispensing repeaters 30 therefrom. As discussed below, the dispensing assembly 70 is preferably disposed at the bottom of the drone 60 for simplicity and to prevent repeaters 30 from becoming entangled with other components upon dispensing.

The frame 66 may comprise at least one cross bar optionally holding three or more spaced apart depending legs 34 for resting upon the support surface and spacing the bottom tray 71 therefrom. An axially rotatable longitudinal shaft 68 is preferably concentrically centered on the frame 66 and depends from a cross bar of the frame 66 to define a longitudinal axis LA. Each rotatable propeller 63 is driven by a battery 36 powered propeller-motor 35 and is rotatable about a respective propeller axis. The rotatable shaft 68 is driven by a battery 36 powered shaft-motor 35. The shaft-motor 35, propeller axes and propeller-motors 35 may be mutually axially parallel. For simplicity, the shaft-motor 35 and propeller-motor 35 may be identical.

The drone 60 has at least one rotatable propeller 63, which is driven by a battery 36 powered motor 35. While a quadcopter style drone 60 is shown, one of skill will recognize the invention is not so limited and the drone 60 may comprise any suitable numbers of copters, associated motors 35 and associated control system.

The dispensing assembly 70 is joined to the depending legs 34 for dispensing a plurality of repeaters 30 therefrom at determinable locations. The dispensing assembly 70 preferably comprises at least one circular tray 71 concentric with the axially rotatable shaft 68 and adapted to carry a plurality of circumferentially spaced repeaters 30 thereon. The circular tray 71 has a central blind hole or through hole for accommodating the rotatable shaft 68. The shaft 68 is preferably rotatable driven by a dedicated shaft motor 35, or may be driven from one or more of the of the propeller motors 35.

Figure 6A:
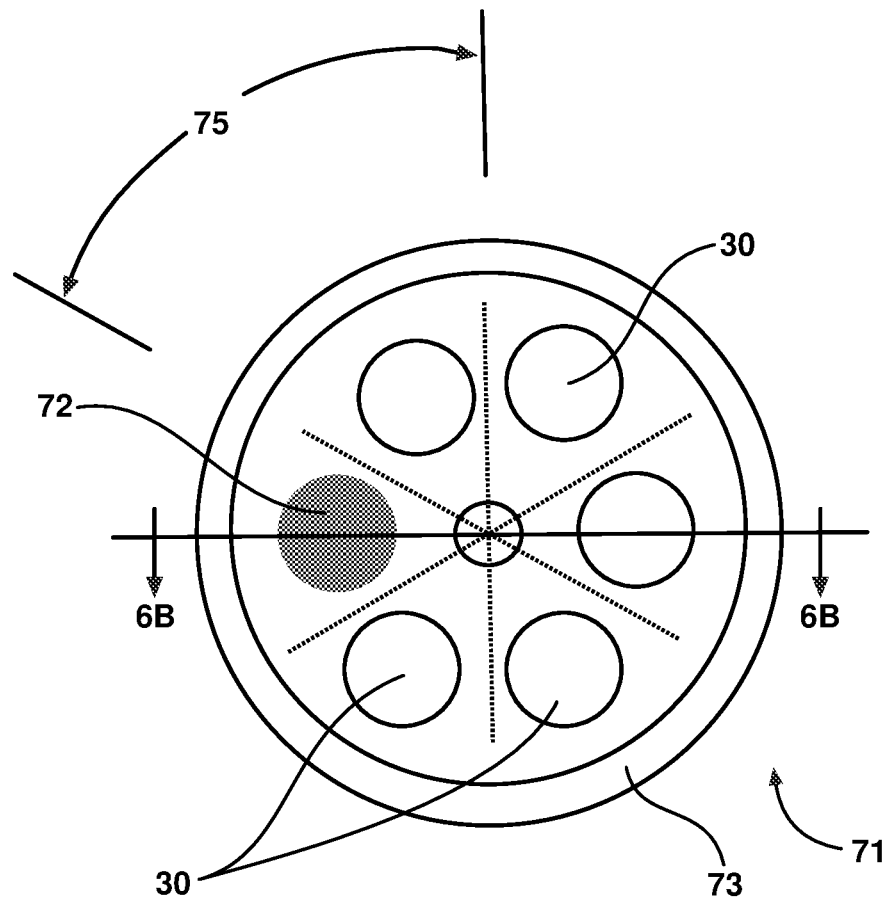
FIG. 6A is a top plan view of a tray having six positions with five repeaters.
Figure 6B:
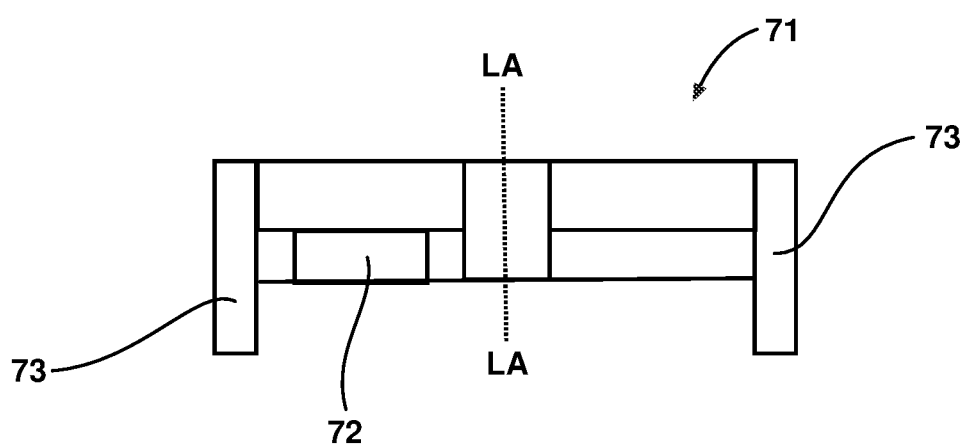
FIG. 6B is a side elevational view of the tray shown in FIG. 6A, taken along lines 6B-6B, and omitting the repeaters for clarity.

Referring to FIG. 6A and FIG. 6B, the circular tray 71 further has a dispensing hole 72 therethrough for receiving and gravity dispensing a repeater 30 therethrough at a desired location and an upstanding lip 73 for retaining repeaters 30 within said tray 71 until dispensed through the dispensing hole 72. The tray 71 preferably has a low friction surface, allowing for smooth movement of the repeaters 30 around the shaft 68 and reducing power requirements. Plural repeaters 30 are circumferentially disposed on the tray 71 and constrained by the lip 73. The repeaters 30 are preferably round to reduce congestion during dispensing. Likewise, the dispensing hole 72 is round and slightly larger than the round repeaters 30 to provide for dispensing therethrough. One of skill will recognize that other shapes of dispensing holes 72 may be suitable, provided that the repeaters 30 congruently fit through the hole for discharge. For example, the dispensing hole 72, and associated repeaters 30, may be oval, rectangular, crescent shaped, etc.

Optionally, the lip 73 may also depend downwardly from the bottom tray 71 of the dispensing assembly 70. Particularly, the lip 73 may depend downwardly in the longitudinal direction a distance slightly greater than the thickness of the repeater 30, as taken in the longitudinal direction. This arrangement provides the benefit that the drone 60 may land at a location determined to be suitable for establishing a repeater station prior to delivery of the repeater 30. Upon temporarily landing to establish a repeater station, the dispensing assembly 70 dispenses a repeater 30 through the dispensing hole 72 at the hole while the drone 60 is stationary and stable.

The depending lip 73 and/or upstanding lip 73 may circumscribe the tray 71 to advantageously provide for maximum stability upon temporarily landing in a hostile environment and containing the repeaters 30 within the tray 71, respectively. Alternatively, the depending lip 73 and/or upstanding lip 73 may comprise circumferentially spaced apart segments to advantageously conserve weight.

Alternatively, the drone 60 may comprise three or more struts 65, four struts 65 being shown, extending downwardly from the bottom of the lowest tray 71. Again, the struts 65 have a length in the longitudinal direction slightly greater than the thickness of the repeater 30, as taken in the longitudinal direction for landing. This arrangement similarly provides the benefit that the drone 60 may temporarily land at a location determined to be suitable for establishing a repeater station prior to stable and stationary delivery of the repeater 30.

Alternatively, the drone 60 may hover slightly above the support surface while dispensing a repeater 30. This arrangement provides the benefit of being capable to dispense a repeater 30 onto a support surface unsuitable for landing due to debris, slope, sticky substances that may impede takeoff, etc.

The dispensing hole 72 may subtend from 30 degrees to 120 degrees of the tray 71. The tray 71 may be adapted to hold from 2 to 11 circumferentially spaced repeaters 30. The perimeter lip 73 may have a height of at least one half of the thickness of the repeater 30, but not be so tall as to impair loading of the repeaters 30 as needed for the mission. The present invention provides the benefit that the same drone 60 may be loaded with different repeaters 30 as best suited for a particular mission.

Referring to FIG. 7, a radial arm 74 extends from a proximal end fixedly joined to the shaft 68 to a distal end juxtaposed with the lip 73. The shaft 68 rotates the arm 74 in response to rotational input from the shaft 68 motor 35. The radial arm 74 has a front side which is the direction of forward arm 74 rotation and a backside opposed thereto. In this embodiment, having the rotatable arm 74, the front side of the arm 74 contacts each repeater 30 to be dispensed in turn.

The movement of the arm 74 about the longitudinal axis LA urges the at least one repeater 30 to circumferentially index and reposition relative to the tray 71. The arms 74 shown in the figure are counterclockwise rotatable in a forward direction. The opposite direction (clockwise as shown) is referred to as the reverse direction.

The arm 74 is preferably concave in the forward direction of rotation, to propel the at least one repeater 30 in the rotation direction, reducing radial stray to minimize undue drag from either the shaft 68 or the inside of the upstanding lip 73. The radius of the arm 74 may decrease as the distal end is approached. This structure provides the benefit that the arm 74 may help to dislodge a repeater 30 if it is lodged against the inside of the lip 73.

A microprocessor 64 indexes the shaft 68, and thus the radial arm 74 a predetermined rotation arc approximately corresponding to the diameter of a round repeater 30. The arc may correspond to one position 75, with each repeater 30 and the dispensing hole 72 comprising one position 75. By way of nonlimiting example, if five repeaters 30 are circumferentially disposed on the tray 71, there are six total positions 75—one for each repeater 30 and one for the dispensing hole 72. Each position 75 of the tray 71 subtends 60 degrees and each index of the shaft 68 and arm 74 one position 75 would likewise subtend 60 degrees of forward rotation.

A dedicated servomotor 35 attached to the flight control board may be used to rotate the shaft 68. Preferably the servomotor 35 has a stall torque of at least about 2 Kg-cm, a response speed of at least 0.1 sec/60 degrees, an operating voltage of 4-6 VDC and a deadband width about 5 microseconds or less. A Tower Pro MG90S Micro Servo available from American Robotic Supply of Pikeville, NC has been found suitable, with either the 4.8V or 6V model being judged as suitable.

Referring back to FIG. 6A and FIG. 6B, upon command from the base station 21 the first rotation indexes the radial arm 74 one position 75 and dispenses the first repeater 30 through the hole 72. The remaining repeaters 30 advance one position 75, with the second repeater 30 being circumferentially adjacent the dispensing hole 72. Likewise, upon command from the base station 21, the second rotation advances the arm 74 again, and dispenses the second repeater 30. Each of the other repeaters 30 advances in turn. This process is continued until the desired number of repeaters 30 is dispensed.

The present invention advantageously dispenses repeaters 30 in an upright position 75 and onto almost any type of generally horizontal surface. If the repeaters 30 are dispensed edgewise or upside down, operation will likely be impaired. For example, if the repeaters 30 are dispensed right side up, relocation and orientation is possible, as described below. If the repeaters 30 have a diameter to height aspect ratio of about 1 to about 8, and preferably about 1.5 to about 5, prophetically unintended inversion during dispensing is reduced. A repeater 30 having a diameter of 7 centimeters and height of 4.5 centimeters has been found to work well without inversion when dispensed through a dispensing hole 72 having a diameter of 7.4 centimeters and a tray 71 having a diameter of 20.3 centimeters. If a non-round repeater 30 is used, the aspect ratio is taken as the ratio of the minor footprint dimension to the maximum thickness.

Furthermore, typical repeaters 30 have a heading angle and corresponding longitudinal axis RA which are preferably oriented to best transceive the signals. The repeaters 30 may be loaded onto the tray 71 with the heading angles in a predetermined orientation. With the structure of this invention, the repeaters 30 generally do not rotate about their own central axis during indexing and dispensing.

For example, the repeaters 30 may be loaded with the heading angles of the respective repeaters 30 radially oriented towards or away from the central shaft 68. Thus the present invention advantageously provides the benefits of both right side up dispensing and providing a preferred azimuthal orientation for the heading angle.

If desired, the tray 71 may have a circumferential upstanding tongue and the bottom of the repeater 30 may have a complementary groove into which the tongue is slidably and removably fitted during loading. This structure provides the benefit that as the repeater 30 is indexed around the tray 71, the heading angle of the longitudinal axis RA of the repeater 30 is known at all times. In another embodiment the tray 71 may have two groves, each concentric with the longitudinal axis LA. The grooves may be complementary to the legs 34 of the repeaters 30, so that the repeater 30 rides in the grooves until dispensed through the hole. This arrangement provides the further benefit that the repeater 30 can use the existing legs 34 for the dual purposes of positioning while in the tray 71 and locomotion after dispensing.

If desired, the dispensing assembly 70 of the drone 60 may comprise an optional plurality of any reasonable number of vertically stacked trays 71. This embodiment provides the benefit of decoupling payload, particularly the repeater 30 capacity, from the footprint. In this embodiment, more repeaters 30 can be carried without increasing the size of the footprint.

In such an embodiment, all of the trays 71 are mutually concentric with the central shaft 68. Each tray 71 has the aforementioned dispensing hole 72, the constraining upstanding perimeter lip 73 and a shaft 68 driven, dedicated radial arm 74 for indexing and dispensing of the repeaters 30 through a dispensing in that tray 71. The trays 71 may be longitudinally separated from adjacent trays 71 by a distance of 1.2 T to 2 T to prevent misalignment of the repeater 30 during the gravity drop from the superjacent tray 71, where T is the maximum thickness of the repeater 30 and the drop is measured from the lower surface of the superjacent tray 71 to the upper surface of the subjacent tray 71.

In this embodiment, the top tray 71 may be considered as the first tray 71 and dispenses the repeaters 30 through the dispensing hole 72, as described above, down to the second tray 71. The second tray 71 may be spaced from the first tray 71 in the longitudinal direction. When the longitudinal axis LA is vertical, the second tray 71 is directly below the first tray 71, an optional third tray 71 is directly below the second tray 71, and so on until the bottom tray 71 is reached. In this embodiment, the first tray 71 dispenses repeaters 30 onto the second tray 71, the second tray 71 dispenses repeaters 30 onto the third tray 71, if present, etc. The lower or lowest tray 71 dispenses the repeater 30 onto the desired support surface of the environment.

In such an arrangement, preferably each tray 71 has the same number of positions 75 to improve balance around the shaft 68. Each tray 71 has a circumferentially disposed first position 75. The first position 75 is immediately behind the dispensing hole 72, so that upon indexing the radial arm 74 in the forward direction a first repeater 30 can be dispensed therethrough. The second position 75 advances to the first position 75 upon indexing one rotation arc. Another index of the radial arm 74 rotates that position 75 to the dispensing hole 72 to dispense another repeater 30 therethrough, until the last position 75 intercepts the dispensing hole 72 to deliver a repeater 30 therethrough. In a single tray 71 embodiment the repeater 30 is dispensed onto a support surface in a hostile environment. In a plural tray 71 embodiment, the repeater 30 may first be dispensed from its initial payload tray 71 to a subjacent tray 71, then later dispensed onto the support surface.

Referring to FIG. 8, in a plural tray 71 embodiment the dispensing hole 72 on the first (top) tray 71 may be in a first circumferential position 75. The dispensing hole 72 of the first tray 71 is longitudinally (vertically) aligned with the last position 75 of the second tray 71. The dispensing hole 72 of each tray 71 is then vertically aligned with the last position 75 of the subjacent tray 71 so that maximum repeater 30 capacity is achieved for each tray 71.

For example, in a triple tray 71 embodiment having arms 74 which rotate counterclockwise in the forward direction, the dispensing hole 72 in the top tray 71 may be disposed at a first dispensing position 75. The dispensing hole 72 of the second tray 71 is preferably longitudinally aligned one position 75 counterclockwise relative to the hole of the first tray 71, to correspond to the last dispensing position 75 of the second tray 71 and maximize utilization of tray 71 capacity. The dispensing hole 72 of the third tray 71 is likewise aligned one position 75 counterclockwise relative to the hole of the second tray 71 and so on.

Similarly, the arm 74 of each tray 71 leads the arm 74 of the superjacent tray 71 one position 75. In the forward counterclockwise example, the arm 74 of the second tray 71 leads the arm 74 of the first tray 71 one position 75 counterclockwise of the arm 74 of the first tray 71 and so on.

Each tray 71 has the respective arm 74 behind the first repeater 30 so that the first repeater 30 of each tray 71 is indexed as dispensing occurs. This geometry advantageously provides that as the first tray 71 dispenses its repeater 30 onto the last position 75 second tray 71, the second tray 71 automatically and likewise dispenses its first repeater 30 onto hostile environment, and so on. This arrangement provides the benefit that the first tray 71 is always fully loaded and ready for dispensing the repeaters 30 previously carried by the trays 71 above.

If desired for increased capacity, the drone 60 may have two or more parallel shafts 68, each shaft 68 having a respective and dedicated tray 71 or a respective dedicated vertical stack of trays 71. The shafts 68 would alternatingly index and dispense the repeaters 30 from the respective tray 71 to maintain balance. Such a drone 60 would prophetically have six or more copters for adequate lift.

One of skill will understand that the repeaters 30 are likely dispensed in series with the first repeater 30 being closest to the base station 21, the second repeater 30 being dispensed in direct communication with the first repeater 30, etc. But one of skill will likewise recognize that the changing conditions of a hostile environment may dictate dispensing the repeaters 30 in a sequence out of order from the line of sight. The repeaters 30 may be mutually identical, providing the benefit of simplicity and economy of design. Alternatively, some of the repeaters 30 may be mutually different, providing the benefit that different repeaters 30 may be deployed as most suitable for a particular repeater 30 station during the mission.

In an alternative embodiment, the dispensing assembly 70 may have a longitudinally coaxial shaft 68 assembly, comprising a stationary outer shaft 68 and an axially rotatable inner shaft 68. The radial arm 74 may be joined to the outer shaft 68 in nonrotatable and fixed relationship. The tray 71 may be joined to the inner shaft 68, which in turn is joined to the servomotor 35. In this embodiment, the tray 71 is either loaded with the repeaters 30 such that, or is rotated such that, the repeaters 30 are eventually dammed into a set position 75 by the fixed radially arm 74. The repeaters 30 contact the backside of a stationary arm 74. In both embodiments one of the tray 71 and arm 74 moves relative to the other.

The tray 71 is then indexed with respect to the nomoving repeaters 30, so that the tray 71 slides under the repeaters 30 until the dispensing hole 72 is coincident a repeater 30. The repeater 30 is then gravity dispensed through the hole. At the next repeater station the tray 71 is indexed again and the second repeater 30 is gravity discharged through the dispensing hole 72. This process is repeated until the desired number of repeaters 30 is dispensed into the hostile environment.

In an alternative embodiment the tray 71 may have two diametrically offset dispensing holes 72 and two diametrically offset dispensing arms 74. This embodiment provides the benefit that two repeaters 30 may be simultaneously dispensed in mutually close proximity for redundancy and reducing dispensing time. In an alternative embodiment, the tray 71 may be slightly concave upwardly shaped, to reduce friction of the repeaters 30 against the perimeter lip 73. Plural trays 71 may be of the same diameter or of different diameters, as desired.

Figure 9A:
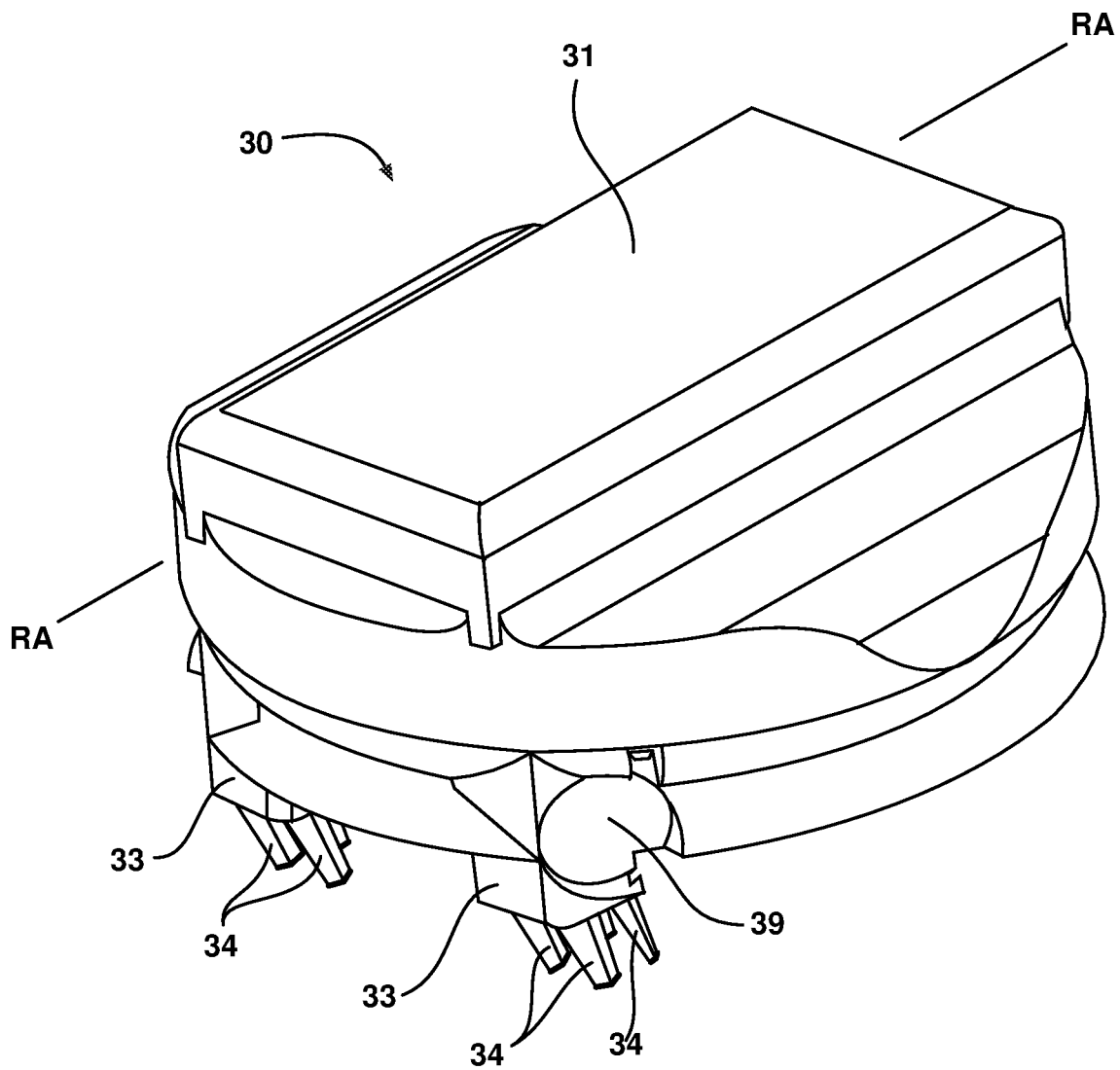
FIG. 9A is a top perspective view of a dynamically controllable repeater according to the present invention.
Figure 9B:
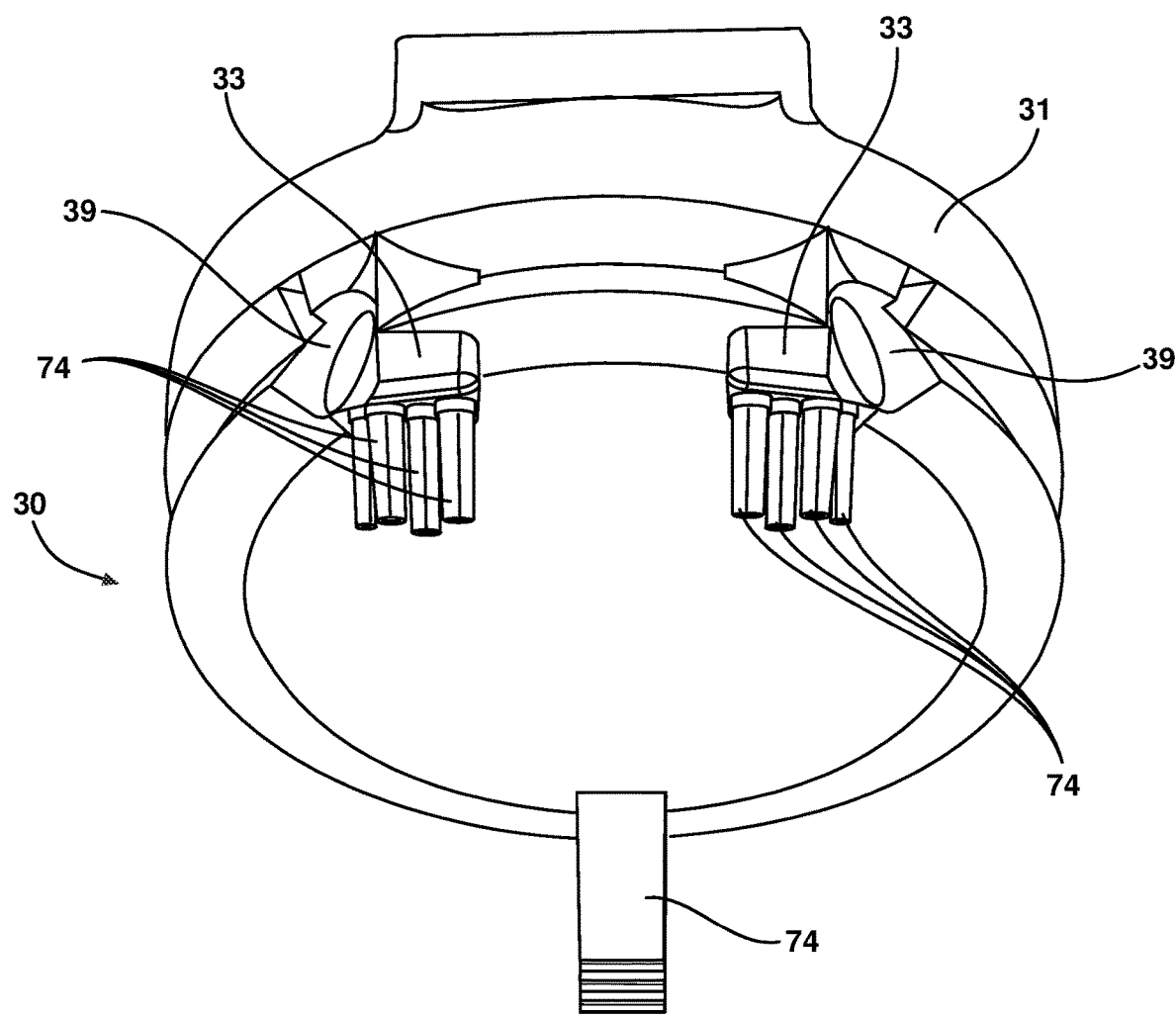
FIG. 9B is a bottom perspective view of the repeater of FIG. 9A.

Referring to FIG. 9A and FIG. 9B, each repeater 30 has a shell 31 defining a longitudinal axis RA. The repeater shell 31 preferably has a round footprint to avoid misalignment during dispensing and enable maneuvering near a wall or other obstruction. The diameter of the shell 31 is complementary to the radial width of the tray 71, so that the repeater 30 may move in circular fashion to the dispensing hole 72. When the repeater 30 is loaded onto the tray 71, the longitudinal axis RA of the repeater 30 and longitudinal axis LA of the drone 60 are mutually perpendicular.

A key performance metric is network signal strength. The position and orientation of the repeater 30 are the means to achieving a robust and adequate wireless network. The base station 21 can command a repeater 30 to move and assess whether the signal strength of the network improved or degraded and command the repeater 30 to move in the direction that improves the network signal processing.

In operation, as the drone 60 travels through the hostile environment using a control algorithm, the drone 60 dispenses plural repeaters 30 at a like plurality of repeater stations according to two criteria: not to exceed maximum separation distance for that communication system 20 and at corners. Preferably, repeaters 30 are consecutively positioned at predetermined separation distances which range from 50 to 70 percent of the maximum wireless communication range between successive repeaters 30 for buffer. This range provides a safety margin in the mesh network, and allows for future self-healing of the network if a repeater 30 becomes inoperable. Spacing the repeaters 30 too close together may require excessive quantities of repeaters 30, complicating the mission. Spacing the repeaters 30 too far apart can jeopardize communications.

Additionally when a repeater 30 is dispensed when the drone 60 encounters a corner, in order to maintain line of sight between the successive repeaters 30. Recognition of corners is based upon threshold deviations in the movement of the drone 60 in an X-Y plane, indicating that the drone 60 is moving in a path having a vector component 90 degrees to the previous path, and has thus turned a corner. Stairs and other elevation changes may be recognized based upon threshold deviations in the Z direction, it being understood the X, Y and Z directions are mutually perpendicular.

The repeaters 30 may be disposed in a single series from the base station 21 to a first repeater station, to a second repeater station to a plurality of additional intermediate repeater stations and so on until the repeater 30 at the last repeater station is in communication with the forward agent 25. Optionally, the series of repeaters 30 may branch and provide two different and alternative paths from the base station 21 to the forward agent 25 for redundancy. Alternatively, the series of repeaters 30 may branch and lead to two or more forward agents 25 at two or more different locations in the hostile environment.

To the extent that the figures illustrate diagrams of the functional blocks of the various embodiments, the functional blocks are not necessarily indicative of the division between hardware circuitry. Thus, for example, one or more of the functional blocks (e.g., processors or memories) may be implemented in a single piece of hardware (e.g., a signal processor or a block of random access memory, hard disk, or the like) or multiple pieces of hardware. Similarly, the programs may be standalone programs, may be incorporated as subroutines in an operating system, may be functions in an installed software package, and the like. The upper limit of any range may be combined with the lower limit of any range for that same parameter and vice versa. It should be understood that the various embodiments are not limited to the arrangements and instrumentality shown in the drawings.

What is claimed is:

1. An unmanned aerial drone for delivering a plurality of repeaters to remote locations, said drone comprising:
at least one copter for flying said drone from a first location to a second location, each said at least one copter having at least one respective propeller-motor driven rotatable propeller;

a shaft-motor driven axially rotatable longitudinal shaft extending from a first end operably connected to said shaft-motor to a second end longitudinally spaced therefrom to define a longitudinal axis;

a microcontroller for controlling said drone;

at least one battery in electrical communication with and for supplying energy to each said at least one propeller-motor, said microprocessor and said shaft-motor;

a frame for joining said microprocessor, said at least one battery, said shaft-motor and said at least one propeller-motor driven propeller in operable relationship;

a dispensing assembly joined to and depending from said frame for dispensing a plurality of repeaters therefrom at determinable repeater stations; said dispensing assembly comprising: a first circular tray adapted to carry a plurality of circumferentially spaced repeaters thereon; said first tray having a first dispensing hole therethrough for gravity dispensing a repeater from the plurality of circumferentially spaced repeaters therethrough and a first upstanding perimeter lip for retaining the repeaters within said tray until dispensed; and a first radial arm extending from a proximal end joined to said shaft to a distal end juxtaposed with said upstanding perimeter lip, said first radial arm being responsive to a command signal from said microprocessor to be rotatable about said longitudinal axis in a forward rotation direction in order to propel at least one repeater in said forward rotation direction towards said dispensing hole.

2. A drone according to claim 1 further comprising a second tray longitudinally outwardly disposed from said first tray and operably spaced therefrom to receive a repeater dispensed through said first dispensing hole in said first tray to said second tray; said second tray having a second upstanding perimeter lip for retaining repeaters within said second tray until dispensed and a second dispensing hole therethrough for gravity dispensing a repeater at a desired location, said longitudinal shaft extending to said second tray and having a second radial arm extending from a proximal end joined to said shaft to a distal end juxtaposed with said lip, said second radial arm being rotatable in said forward rotation direction to propel at least one repeater in the rotation direction towards said second dispensing hole.

3. A drone according to claim 2 carrying at least one repeater, each said at least one repeater having a thickness, and wherein said first tray and said second tray each have a first surface facing towards said copter and a second surface opposed thereto, said second surface of said first tray being spaced from 1.2 T to 2 T from said first surface of said second tray.

4. A drone according to claim 2 wherein said first tray and said second tray have an equal number of equally circumferentially spaced predetermined positions for receiving and temporarily holding a number of repeaters therein, the number of repeaters being one less than the number of positions.

5. A drone according to claim 4 wherein said microprocessor sends a command signal to said shaft-motor to index said radial arm in said forward direction an arc corresponding to one said position.

6. A drone according to claim 5 wherein said first dispensing hole is circumferentially offset from said second dispensing hole one position in said forward direction.

7. A drone according to claim 6 wherein said first radial arm is circumferentially offset from said second radial arm one position in said forward direction.

8. A quadrotor aerial drone for delivering a plurality of repeaters to remote locations, said quadrotor drone comprising:

four battery powered independently operable motor-driven rotatable propellers and a battery therefor and in electrical communication therewith, a frame for joining said at least one battery and said at least one propeller-motor driven propeller in operable relationship;

a dispensing assembly joined to and depending from said frame for dispensing a plurality of repeaters therefrom at determinable repeater stations; said dispensing assembly comprising: a tray adapted to carry a plurality of circumferentially spaced repeaters thereon, each of the repeaters defining a repeater position when disposed on said tray; said tray having a first dispensing hole therethrough for gravity dispensing a repeater a from the plurality of circumferentially spaced repeaters therethrough and an upstanding perimeter lip for retaining the repeaters within said tray until dispensed;

a shaft-motor driven axially rotatable longitudinal shaft extending from a first end operably connected to said shaft-motor to a second end juxtaposed with said tray, said shaft motor being fixedly joined to said frame and defining a longitudinal axis;

at least one battery in electrical communication with and for supplying energy to each said propeller-motor and said shaft-motor;

a radial arm extending from a proximal end joined to said shaft to a distal end juxtaposed with said upstanding perimeter lip, said radial arm being rotatable in a forward rotation direction in order to propel at least one repeater in said forward rotation direction towards said dispensing hole; and a battery powered microprocessor for sending a command signal to rotatably index said shaft-motor one position in said forward direction upon demand to thereby rotate said radial arm one position in said forward direction.

9. A drone according to claim 8 wherein said hole is circular and sized to receive at least one circular repeater therethrough.

10. A drone according to claim 8 wherein said tray is circular and concentric with said longitudinal shaft.

11. A drone according to claim 10 wherein said hole subtends from 30 degrees to 120 degrees and said tray is adapted to hold from 2 to 11 repeaters circumferentially spaced from said hole accordingly.

12. A drone according to claim 11 wherein said arm is concave in said forward direction.

13. A drone according to claim 12 wherein said arm has a decreasing radius of curvature as said distal end thereof is approached.

14. A drone according to claim 12 further comprising a plurality of repeaters disposed on said tray and being dispensable through said dispensing hole.

15. A method of delivering a plurality of repeaters to remote locations, said method comprising the steps of:

providing an unmanned aerial drone having plural motor driven propellers, a motor driven axially rotatable longitudinal shaft extending from a first end to a second end juxtaposed with a dispensing assembly for dispensing a plurality of repeaters therefrom at determinable repeater stations; said dispensing assembly comprising:

a first tray adapted to carry a plurality of circumferentially spaced repeaters thereon; said first tray having a dispensing hole for gravity dispensing a repeater therethrough and an upstanding perimeter lip for retaining the repeaters within said tray until dispensed, a radial arm extending from a proximal end joined to said shaft to a distal end juxtaposed with said upstanding perimeter lip of said, said radial arm being rotatable in a forward rotation direction upon command in order to propel at least one repeater towards said dispensing hole in said forward direction and said drone a microprocessor for sending a command signal to said shaft-motor to rotate said radial arm upon demand;

at a base station, loading a plurality of repeaters on said tray, said repeaters being circumferentially spaced around said longitudinal shaft;

piloting said drone from said base station to a determinable first repeater station;

temporarily pausing said drone at said first repeater station in a stationary manner and rotating said arm in a forward direction through an arc sufficient to sweep a first said repeater to said dispensing hole, to thereby deliver said first repeater from said plurality of repeaters to said first repeater station of said determinable repeater stations by gravity dropping through said dispensing hole to a support surface there below.

16. A method according to claim 15 wherein each said repeater has a thickness, and said step of pausing said drone at said first repeater station comprises hovering said drone from 1.2 T to 2 T above said support surface while disposing said repeater.

17. A method according to claim 16 wherein said step of loading a plurality of repeaters on said tray comprises loading mutually identical repeaters onto said tray.

18. A method according to claim 17 further comprising the step of delivering each remaining said repeater disposed on said tray to a like plurality of determinable, spaced apart repeater stations in a line of sight communication.

19. A method according to claim 18 wherein said tray is empty of repeaters and further comprising the step of piloting said drone towards a perceived threat while remaining in line of sight communication with at least one repeater disposed at a corresponding repeater station.

20. A method according to claim 19 wherein said repeaters are delivered in series from a first said repeater to be delivered to a last said repeater to be delivered and said drone is in line of sight communication with said last repeater to be delivered.

* * * * *